US012704951B2

(12) United States Patent
Jiang et al.

(10) Patent No.: US 12,704,951 B2
(45) Date of Patent: Aug. 11, 2026

(54) IMAGE PROCESSING METHOD, ELECTRONIC DEVICE AND STORAGE MEDIUM

(71) Applicant: BEIJING BYTEDANCE NETWORK TECHNOLOGY CO., LTD., Beijing (CN)

(72) Inventors: Ruyu Jiang, Beijing (CN); He Li, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 261 days.

(21) Appl. No.: 18/389,210

(22) Filed: Nov. 13, 2023

(65) Prior Publication Data

US 2024/0078645 A1 Mar. 7, 2024

Related U.S. Application Data

(63) Continuation of application No. 17/888,360, filed on Aug. 15, 2022, now Pat. No. 11,847,767, and a (Continued)

(30) Foreign Application Priority Data

Feb. 24, 2020 (CN) ........................ 202010113046.X

(51) Int. Cl.
*G06T 5/00* (2024.01)
*G06F 3/04845* (2022.01)
(Continued)

(52) U.S. Cl.
CPC ............ *G06T 5/77* (2024.01); *G06F 3/04845* (2013.01); *G06F 3/04847* (2013.01); *G06F 3/04886* (2013.01); *G06T 11/60* (2013.01)

(58) Field of Classification Search
CPC ....... G06T 5/77; G06T 11/60; G06F 3/04845; G06F 3/04847; G06F 3/04886; G06F 3/04883
See application file for complete search history.

(56) References Cited

U.S. PATENT DOCUMENTS 7,953,275 B1 5/2011 Wolfram
2005/0175260 A1* 8/2005 Takahashi .............. G06T 11/60 382/309

(Continued)

FOREIGN PATENT DOCUMENTS

CN 103544021 A 1/2014
CN 103593828 A 2/2014

(Continued)

OTHER PUBLICATIONS

English translation of CN 107909634 (Year: 2018).*

(Continued)

*Primary Examiner* — Iriana Cruz
(74) *Attorney, Agent, or Firm* — BakerHostetler

(57) ABSTRACT

The present disclosure describes techniques for processing images. The techniques comprise displaying an interface configured to perform local retouching on a partial area of an image, wherein the interface comprises a first area configured to adjust a size of the partial area of the image, and wherein the interface further comprises a second area configured to apply at least one retouching parameter to the partial area of the image; determining the partial area of the image in response to receiving a user input; and implementing the local retouching on the partial area of the image in response to receiving touch operations via the interface.

17 Claims, 6 Drawing Sheets

Related U.S. Application Data continuation of application No. PCT/CN2021/077238, filed on Feb. 22, 2021.

(51) Int. Cl.

| | |
|---|---|
| ***G06F 3/04847*** | (2022.01) |
| ***G06F 3/04886*** | (2022.01) |
| ***G06T 5/77*** | (2024.01) |
| ***G06T 11/60*** | (2026.01) |

(56) References Cited

U.S. PATENT DOCUMENTS

| | | | | |
|---|---|---|---|---|
| 2006/0098220 | A1 | 5/2006 | Oh et al. | |
| 2012/0020553 | A1 | 1/2012 | Pettigrew et al. | |
| 2012/0099153 | A1 | 4/2012 | Aoki | |
| 2013/0127709 | A1 | 5/2013 | Spielberg | |
| 2013/0328906 | A1* | 12/2013 | Webb | G09G 5/02 345/590 |
| 2015/0040042 | A1* | 2/2015 | Huang | G06F 3/04817 715/762 |
| 2016/0216797 | A1 | 7/2016 | Geng et al. | |
| 2017/0039320 | A1* | 2/2017 | Shimomura | G16H 50/70 |
| 2017/0075554 | A1 | 3/2017 | Sasayama | |
| 2018/0095653 | A1* | 4/2018 | Hasek | G06F 3/04883 |
| 2019/0034649 | A1* | 1/2019 | Konita | G06F 21/604 |
| 2020/0068095 | A1 | 2/2020 | Nabetani | |
| 2020/0110561 | A1 | 4/2020 | Kaneko | |

FOREIGN PATENT DOCUMENTS

| | | | |
|---|---|---|---|
| CN | 104574256 | A | 4/2015 |
| CN | 104636025 | A | 5/2015 |
| CN | 104731460 | A | 6/2015 |
| CN | 104751503 | A | 7/2015 |
| CN | 105205780 | A | 12/2015 |
| CN | 105307051 | A | 2/2016 |
| CN | 106055247 | A | 10/2016 |
| CN | 106484257 | A | 3/2017 |
| CN | 106502538 | A | 3/2017 |
| CN | 106709886 | A | 5/2017 |
| CN | 107817939 | A | 3/2018 |
| CN | 107909634 | A | 4/2018 |
| CN | 108540729 | A | 9/2018 |
| CN | 108573532 | A | 9/2018 |
| CN | 108646969 | A | 10/2018 |
| CN | 108983964 | A | 12/2018 |
| CN | 109076196 | A | 12/2018 |
| CN | 109542308 | A | 3/2019 |
| CN | 109671024 | A | 4/2019 |
| CN | 110430356 | A | 11/2019 |
| CN | 111324270 | A | 6/2020 |

OTHER PUBLICATIONS

International Patent Application No. PCT/CN2021/077238; Int'l Written Opinion and Search Report; dated May 27, 2021; 7 pages.

"An easy-to-understand guide to retouching images"; https://www.douban.com/note/638848388/?_i=0567537F38_8J2; Sep. 2017; accessed Aug. 15, 2022; 22 pages.

"A color selection tool that can be used by fingers with thick carrots—Spicy Retouching Tutorial 4"; www.360doc.com/content/18/0419/21/35677946_747124533.shtml; Apr. 2018 accessed Aug. 18, 2022; 14 pages.

"Quick start with snapseed (6) Local adjustment"; https://www.douban.com/note/719354175/?_i_0567937F38_8J2.0568162F38_8J2; May 2019; accessed Aug. 15, 2022; 19 pages.

"Polarr in one minute"; https:/new.qq.com/omn/20180319/20180319BIQQ6L.html_2020/9/9; Tencent; Mar. 2018; accessed Sep. 9, 2020; 25 pages.

"A color selection tool that can be used by fingers with thick carrots—Spicy Retouching Tutorial 4"; https://mp.weixin.qq.com/s/UQENQbcfBhbs/Qnkms_B-g; Apr. 2018; accessed Aug. 15, 2022; 19 pages.

"Local adjustment, mobile phone can also professionally retouch pictures #Snapseed 05"; https://www.163.com/dy/article/DDLBCA890525KOOP.html; Mar. 2018; accessed Aug. 29, 2022; 26 pages.

* cited by examiner

IMAGE PROCESSING METHOD, ELECTRONIC DEVICE AND STORAGE MEDIUM

CROSS REFERENCE TO RELATED APPLICATION

The present application is a continuation of U.S. patent application Ser. No. 17/888,360, filed on Aug. 15, 2022, which is a continuation of International Patent Application No. PCT/CN2021/077238, filed on Feb. 22, 2021, which claims priority to Chinese Patent Application No. 202010113046.X, titled "IMAGE PROCESSING METHOD AND COMPONENT, AND ELECTRONIC DEVICE AND STORAGE MEDIUM", filed on Feb. 24, 2020, all of which are incorporated herein by reference in their entireties.

BACKGROUND

Conventional image processing software, for example, an image retouching software, may be used to retouch an entire image. However, the conventional image processing software cannot fulfil needs of people. Improved techniques for retouching images are desirable.

SUMMARY

An image processing method, an electronic device and a storage medium are provided according to the present disclosure, with which a touch operation for adjusting a size of a local adjustable area can be performed via a touch area, for example, a first touch area. In this way, a problem of adjusting a local adjustable area with a preset gesture can be avoided, so that the preset gesture can be released, thereby avoiding misoperation and improving user experience.

In a first aspect, an image processing component is provided according to an embodiment of the present disclosure, which is applied to an electronic device. The image processing component includes at least: a display control and a local retouching control. The display control is configured to display, in a first area of a display area, a to-be-edited image or a target image obtained by retouching the to-be-edited image. The local retouching control is configured to activate a local retouching function in response to a control instruction, to determine a local adjustable area for local retouching, where the local adjustable area is selected from the to-be-edited image or the target image based on a selection operation performed on the to-be-edited image or the target image, and the local adjustable area is displayed via a preset mask to be distinguished from other areas in the to-be-edited image or the target image.

In a case that the local retouching function is activated, the local retouching control is further configured to display a local retouching interface, and the local retouching interface displays at least a first touch area for adjusting a size of the local adjustable area, and a second touch area including at least a retouching parameter for retouching the local adjustable area.

Here, the local retouching interface of the solution of the present disclosure not only displays the second touch area including a retouching parameter, but also displays the first touch area that may adjust the size of the local adjustable area, so that the retouching parameter is used to retouching the local adjustable area, and the first touch area is used to adjust the size of the local adjustable area, the operation of which is simple. In addition, since it is unnecessary to set a preset gesture to adjust the size of the local adjustable area, the preset gesture is released when there are limited gesture operation manners. The problem that a preset gesture corresponds to different operation instructions in different scenarios can be avoided, which in turn reduces misoperation, thereby improving the user experience while meeting different needs of users.

In an embodiment, the local retouching control is further configured to display first prompt information in the local adjustable area, where the first prompt information is used for prompting a parameter feature of a retouching parameter that is currently used for retouching the local adjustable area.

Here, in the solution of the present disclosure, since the first prompt information is provided, the first prompt information is used to prompt the user about the parameter feature of the currently corresponding retouching parameter. In this way, the degree of visualization of the image processing process is improved, and the user experience is further improved.

In an embodiment, the local retouching control is further configured to display second prompt information in the local retouching interface, where the second prompt information is at least used for prompting a parameter feature of a historical retouching parameter that is used for retouching the local adjustable area in history.

Here, in the solution of the present disclosure, since the second prompt information is provided, the second prompt information is used to prompt the parameter feature of the historical retouching parameter that has been used on the local adjustable area, so that the user can intuitively perceive the retouching parameter of the local adjustable area used in history. In this way, the degree of visualization of the image processing process can be further improved, and the user experience is further improved.

In an embodiment, a retouching button corresponding to the retouching parameter is displayed in the second touch area. The local retouching control is further configured to display the second prompt information by using the retouching button corresponding to a historical retouching parameter.

In an embodiment, the local adjustable area corresponds to at least a selected state and an adjusted state. The local retouching control is further configured to highlight, in a case that the local adjustable area is in the selected state, the local adjustable area via the preset mask to distinguish the local adjustable area from the other areas in the to-be-edited image or the target image. Alternatively, in a case that the local adjustable area is in the adjusted state, the preset mask on the local adjustable area is hidden.

Here, in the solution of the present disclosure, since the local adjustable area corresponds to two states, namely the selected state and the adjusted state, and in the selected state, the preset mask may be used for highlighting, and in the adjusted state, the preset mask is hidden, so that the user can intuitively perceive a changing state of the local adjustable area during the parameter adjustment process. In this way, the degree of visualization is increased and the usage scenarios are enriched. In addition, a degree of perceive of the user during the adjustment process is increased, thereby realizing refined retouching, thus further improving the user experience.

In an embodiment, the local retouching control is further configured to control the preset mask to highlight within a preset time range in a case that the local adjustable area is in the selected state.

Here, since the highlighting time period of the preset mask may be controlled, from the perspective of visualization, on the basis of improving the intuitive perception of the user, control of the user on the entire image is improved, avoiding the inability to control the overall image due to the highlighting of the preset mask, thereby further improving the user experience.

In an embodiment, a sliding rod is displayed in the first touch area. The local retouching control is further configured to detect a touch operation performed on the sliding rod, and determine, based on an operation feature of the touch operation, an adjustment feature for the size of the local adjustable area, and displays the local adjustable area with an adjusted size.

Here, in the solution of the present disclosure, since the sliding rod is used to adjust the size of the local adjustable area, the process is simple and has a high degree of visualization. Moreover, since it is unnecessary to set a preset gesture to adjust the size of the local adjustable area, the preset gesture is released when there are limited gesture operation manners. The problem that a preset gesture corresponds to different operation instructions in different scenarios can be avoided, which in turn reduce misoperation, thereby improving the user experience while meeting different needs of users.

In an embodiment, the size of the preset mask is the same as the size of the local adjustable area, and changes as the local adjustable area changes.

In an embodiment, the local retouching interface further displays a copy button corresponding to the copy function. The local retouching control is further configured to obtain a retouching feature of a currently selected local adjustable area and form a target local adjustable area at a preset position in the first area in response to a copy operation performed on the copy button, where a retouching feature of the target local adjustable area matches with the retouching feature of the currently selected local adjustable area.

Here, in the solution of the present disclosure, since the copy button is displayed in the local retouching interface, the copy function is realized, which avoids complex operations of users. Moreover, the copy process in the solution of the present disclosure is simple, which may be performed by click on the copy button, to copy the retouching feature of the currently selected local adjustable area at a preset position, that is, form the target local adjustable area at the preset position, where the retouching feature of the target local adjustable area matches with that of the currently selected local adjustable area. That is, with the copy function of the solution of the present disclosure, it is unnecessary to select an operation position in advance, and it is only required to move, after the copy operation is performed successfully, the target local adjustable area to make the retouching feature of the currently selected local adjustable area to act on the target local adjustable area, the operation of which is simple, thereby further improving the user experience.

In a second aspect, an electronic device is provided according to an embodiment of the present disclosure, which includes: a storage component configured to store an image; and an image processing component connected to a storage component, where the image processing component is the above-described image processing component.

In a third aspect, an image processing method is provided according to an embodiment of the present disclosure. A to-be-edited image or a target image obtained by retouching the to-be-edited image is displayed in a first area of a display area of an electronic device, and the method includes: in a case that a local retouching function is activated, selecting a local adjustable area for local retouching from the to-be-edited image or the target image based on a selection operation performed on the to-be-edited image or the target image, where the local adjustable area is displayed via a preset mask to be distinguished from the other areas in the to-be-edited image or the target image; and in response to a touch operation performed on a first touch area in a local retouching interface, adjusting a size of the local adjustable area, where the local retouching interface is displayed in another area of the display area other than the first area, and is used to display, in addition to the first touch area, a second touch area including at least a retouching parameter for retouching the local adjustable area.

In an embodiment, the method further includes: displaying first prompt information in the local adjustable area, where the first prompt information is used for prompting a parameter feature of a retouching parameter that is currently used for retouching the local adjustable area.

In an embodiment, the method further includes: displaying second prompt information in the local retouching interface, where the second prompt information is at least used for prompting a parameter feature of a historical retouching parameter that is used for retouching the local adjustable area in history.

In an embodiment, the second touch area displays a retouching button corresponding to the retouching parameter, and the method further includes: displaying the second prompt information by using the retouching button corresponding to a historical retouching parameter.

In an embodiment, the local adjustable area corresponds to at least a selected state and an adjusted state, and the method further includes: in a case that the local adjustable area is in the selected state, highlighting the local adjustable area via the preset mask to distinguish the local adjustable area from the other areas in the to-be-edited image or the target image; or in a case that the local adjustable area is in the adjusted state, hiding the preset mask on the local adjustable area.

In an embodiment, the method further includes: in a case that the local adjustable area is in the selected state, controlling the preset mask to highlight within a preset time range.

In an embodiment, the first touch area displays a sliding rod, and the method further includes: detecting a touch operation performed on the sliding rod, determine, based on an operation feature of the touch operation, an adjustment feature of a size of the local adjustable area, and display the local adjustable area with an adjusted size.

In an embodiment, a size of the preset mask is the same as the size of the local adjustable area, and changes as the local adjustable area changes.

In an embodiment, the local retouching interface further displays a copy button corresponding to a copy function, and the method further includes: obtaining a retouching feature of a currently selected local adjustable area and form a target local adjustable area at a preset position in the first area in response to a copy operation performed on the copy button, where a retouching feature of the target local adjustable area matches with the retouching feature of the currently selected local adjustable area.

In a fourth aspect, an electronic device is provided according to an embodiment of the present disclosure, which includes a display unit and a processing unit. The display unit is configured to display, in a first area of a display area, a to-be-edited image or a target image obtained by retouching the to-be-edited image, and is further configured to display a local retouching interface in another area than the first area in the display area. The local retouching interface displays at least a first touch area for adjusting a size of the local adjustable area, and a second touch area including at least a retouching parameter for retouching the local adjustable area. The processing unit is configured to select, in a case that a local retouching function is activated, a local adjustable area for local retouching from the to-be-edited image or the target image based on a selection operation performed on the to-be-edited image or the target image, where the local adjustable area is displayed via a preset mask to be distinguished from the other areas in the to-be-edited image or the target image; and adjust a size of the local adjustable area in response to a touch operation performed on the first touch area in a local retouching interface.

In an embodiment, the display unit is further configured to display first prompt information in the local adjustable area, where the first prompt information is used for prompting a parameter feature of a retouching parameter that is currently used for retouching the local adjustable area.

In an embodiment, the display unit is further configured to display second prompt information in the local retouching interface, where the second prompt information is at least used for prompting a parameter feature of a historical retouching parameter that is used for retouching the local adjustable area in history.

In an embodiment, the display unit is further configured to display a retouching button corresponding to the retouching parameter in the second touch area; and display the second prompt information by using the retouching button corresponding to a historical retouching parameter.

In an embodiment, the local adjustable area corresponds to at least a selected state and an adjusted state, and the processing unit is further configured to: in a case that the local adjustable area is in the selected state, highlight the local adjustable area via the preset mask to distinguish the local adjustable area from the other areas in the to-be-edited image or the target image; or in a case that the local adjustable area is in the adjusted state, hide the preset mask on the local adjustable area.

In an embodiment, the display unit is further configured to: in a case that the local adjustable area is in the selected state, control the preset mask to highlight within a preset time range.

In an embodiment, the first touch area displays a sliding rod, and the processing unit is further configured to: detect a touch operation performed on the sliding rod, and determine, based on an operation feature of the touch operation, an adjustment feature for the size of the local adjustable area, and displays the local adjustable area with an adjusted size.

In an embodiment, the display unit is further configured to display a copy button corresponding to a copy function in the local retouching interface, and the processing unit is further configured to: obtain a retouching feature of a currently selected local adjustable area and form a target local adjustable area at a preset position in the first area in response to a copy operation performed on the copy button, where a retouching feature of the target local adjustable area matches with the retouching feature of the currently selected local adjustable area.

In a fifth aspect, an electronic device is provided according to the present disclosure, which includes: one or more processors; a memory communicatively coupled to the one or more processors; and one or more application programs. The one or more application programs are stored in the memory and configured to be executed by the one or more processors, and the one or more programs are configured to perform the above-described method.

In a sixth aspect, a computer-readable storage medium is provided according to the present disclosure, which stores a computer program. The computer program, when executed by a processor, performs the above-described method.

In a seventh aspect, a computer program product is provided according to the present disclosure, which includes computer instructions. The computer instructions, when executed by a processor, perform the above-described method.

In this way, the local retouching interface of the solution of the present disclosure not only displays the second touch area including a retouching parameter, but also displays the first touch area that may adjust the size of the local adjustable area, so that the retouching parameter is used to retouching the local adjustable area, and the first touch area is used to adjust the size of the local adjustable area, the operation of which is simple. In addition, since it is unnecessary to set a preset gesture to adjust the size of the local adjustable area, the preset gesture is released when there are limited gesture operation manners. The problem that a preset gesture corresponds to different operation instructions in different scenarios can be avoided, which in turn reduces misoperation, thereby improving the user experience while meeting different needs of users.

DETAILED DESCRIPTION OF EMBODIMENTS

In order to make the objects, technical solutions and advantages of the present disclosure more clear, the present disclosure is described in detail below with reference to the drawings and embodiments. It should be understood that the embodiments described herein are only used to explain the present disclosure, rather than limiting the present disclosure.

In some processes described in the specification, claims and the drawings of the present disclosure, multiple operations are included, which are performed in a specific order, but it should be clearly understood that these processes may include more or less operations, and these operations may be performed sequentially or in parallel.

Figure 1:
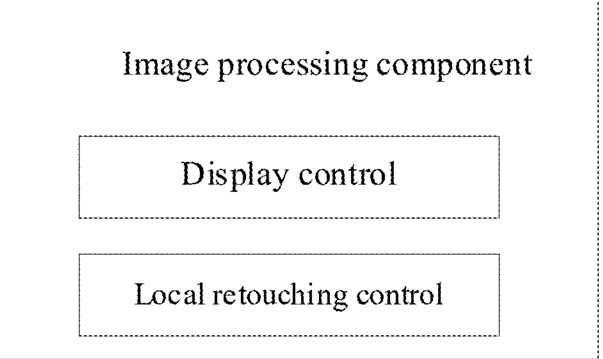
FIG. 1 is a schematic structural diagram of an image processing component according to an embodiment of the present disclosure.

An image processing component is provided according to an embodiment of the present disclosure, which is applied to an electronic device. The solution of the present disclosure will be described in detail below with reference to FIG. 1 to FIG. 3. Specifically, as shown in FIG. 1, the image processing component includes at least a display control and a local retouching control. The display control is configured to display, in a first area of a display area, a to-be-edited image or a target image obtained by retouching the to-be-edited image. The local retouching control is configured to activate a local retouching function in response to a control instruction, to determine a local adjustable area for local retouching. For example, an image processing application program is provided with a button corresponding to the local retouching function, and a control instruction may be generated by pressing the button corresponding to the local retouching function, so as to activate the local retouching function. Here, the local adjustable area is selected from the to-be-edited image or the target image based on a selection operation performed on the to-be-edited image or the target image. For example, the selection operation is a click operation, and an area corresponding to the click operation is determined as the local adjustable area. It should be noted that an initial size of the local adjustable area may be preset according to actual needs, and the selection operation is only used to select a local area in an image displayed in the first area as the local adjustable area of the solution in the present disclosure. Further, the local adjustable area may be displayed by using a preset mask to distinguish from other areas in the to-be-edited image or the target image.

Figure 2:
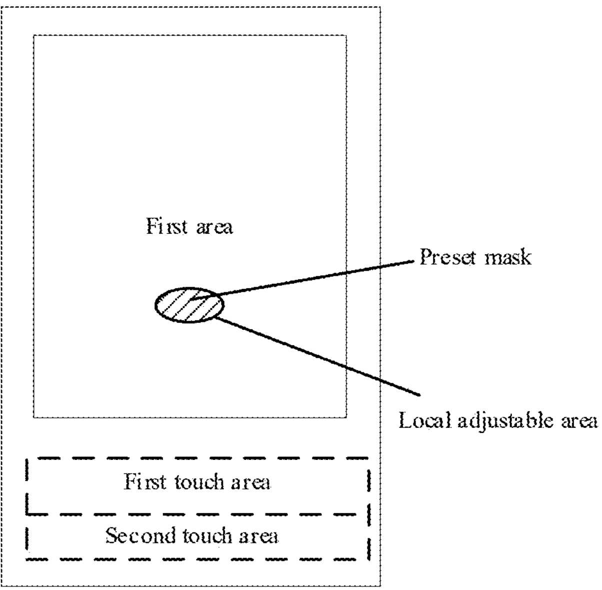
FIG. 2 is a schematic diagram of an interface in a specific example of an image processing component according to an embodiment of the present disclosure.

As shown in FIG. 2, in a case that the local retouching function is activated, the local retouching control is further configured to display a local retouching interface (on another area in the display area than the first area), and the local retouching interface displays at least a first touch area for adjusting a size of the local adjustable area, and a second touch area including at least a retouching parameter for retouching the local adjustable area. It should be noted that an action range of the retouching parameter (that is, a retouching range) matches a range of the local adjustable area in real time. For example, before the retouching, the actin range of the retouching parameter is consistent with the range of the local adjustable area, and after the retouching, the action range of the retouching parameter is also adjusted in real time, and is consistent with the range of the adjusted local adjustable area. That is, the action range of the retouching parameter will change as the size of the local adjustable area changes. For example, if the local adjustable area is adjusted to become larger, the action range of the retouching parameter will affect not only the area corresponding to the local adjustable area before the adjustment, but also the area added after the adjustment; if the local adjustable area is adjusted to become smaller, a part of area originally located in the local adjustable area (that is, before the adjustment) is no longer located in the adjusted local adjustable area due to the reduction, the part of area that is no longer located in the adjusted local adjustable area is no longer within the action range of the retouching parameter. In this way, the size of the local adjustable area can be adjusted by a touch operation performed on the first touch area, so as to adjust the action range of the retouching parameter in real time, thereby realizing refined retouching.

However, in practice, the action range of the retouching parameter may also change as a position of the local adjustable area changes. For example, in a case that the position of the area changes, the action range of the retouching parameter will be adjusted to consistent with the range of the adjusted local adjustable area, so as to realize the local retouching function.

Here, in practice, as shown in FIG. 2, the preset mask covers the local adjustable area, and a size of the preset mask is the same as the size of the local adjustable area, so that the local adjustable area can be distinguished from other areas in the to-be-edited image or the target image, which can facilitate viewing of the user. Moreover, in order to realize a distinguishing display function, the size of the preset mask will also change as the local adjustable area changes. However, in practice, the preset mask has strong light transmittance, so that users can be prevented from being failed to view an image content under the covered area due to occlusion. The preset mask with strong light transmittance may be embodied in various forms, transparency and highlight. This is not limited in the embodiments of the present disclosure, as long as a function of prompting the users can be realized.

Figure 3:
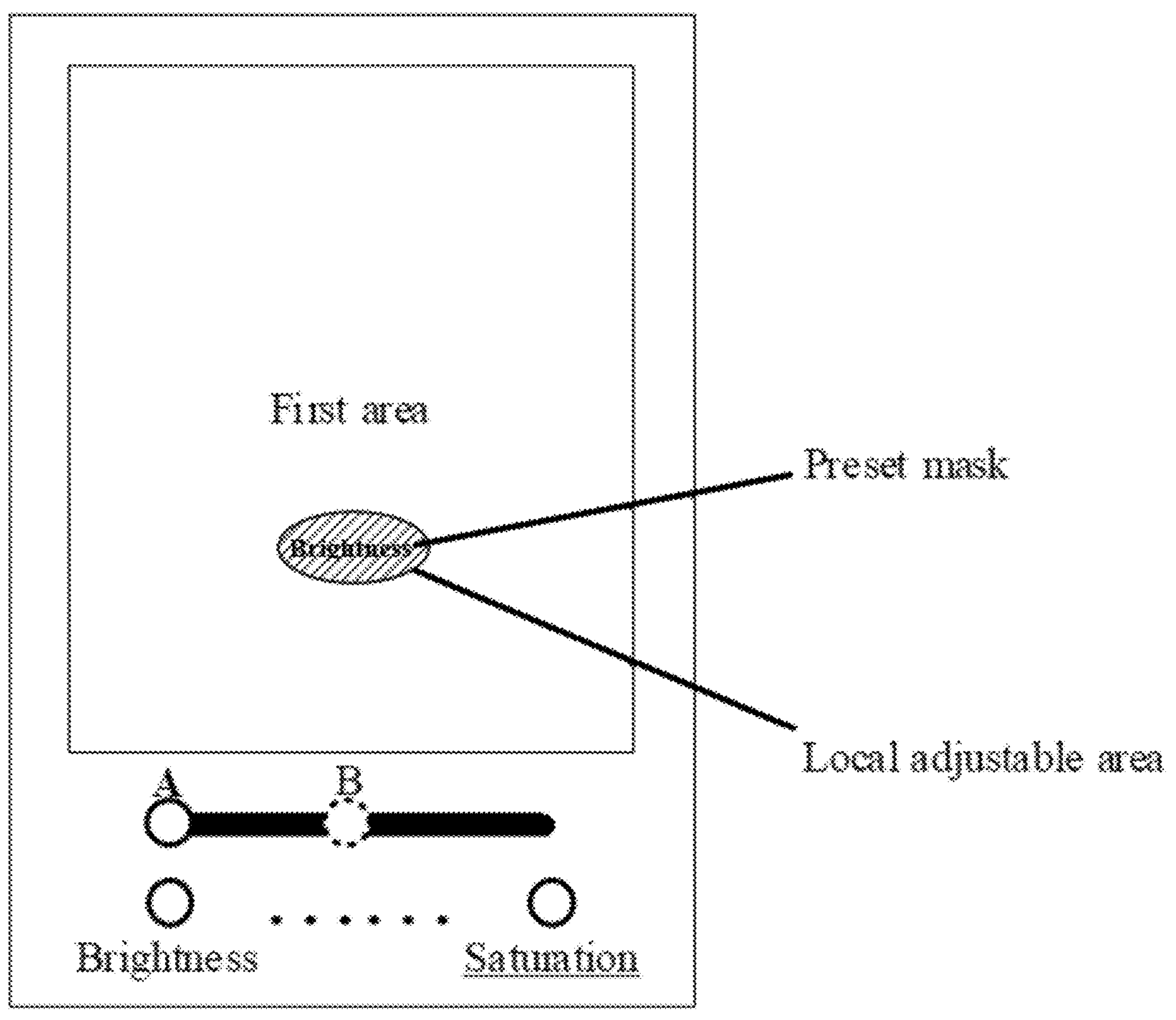
FIG. 3 is a schematic diagram of an interface in another specific example of an image processing component according to an embodiment of the present disclosure.

In a specific example, in order to improve the degree of visualization, prompt information may be displayed in the local adjustable area. Specifically, the local retouching control is further configured to display first prompt information in the local adjustable area, where the first prompt information is used to prompt a parameter feature (for example, a parameter identifier) of the image retouching parameter currently used for performing retouching on the local adjustable area. For example, as shown in FIG. 3, the second touch area displays a brightness button corresponding to a brightness parameter (represented by “Brightness”), and a saturation button corresponding to a saturation parameter (represented by “Saturation”), so that the brightness and saturation of the local adjustable area can be adjusted by using the brightness parameter and the saturation parameter. In view of this, if the brightness parameter adjustment is currently available, “Brightness” is displayed in the local adjustable area to prompt the user that the retouching parameter currently used to perform retouching on the local adjustable area is the brightness parameter. However, in practice, there may also be other prompting manners, which is not limited in the embodiment of the present disclosure.

Here, in practice, the same local adjustable area may be adjusted with multiple retouching parameters, to realize a refined retouching process. In this case, second prompt information may be used to prompt a historical retouching parameter, to facilitate the user to control the entire parameter adjustment process. Specifically, the local retouching control is further configured to display the second prompt information in the local retouching interface, where the second prompt information is used at least to prompt a parameter feature (for example, a parameter identifier) of the historical retouching parameter for retouching the local adjustable area in history. That is, the second prompt information includes a parameter feature of the historical retouching parameter that have been used to retouching the local adjustable area. However, the second prompt information may also include a parameter feature of the image retouching parameter currently used for retouching the local adjustable area. That is, the second prompt information includes parameter features of all image retouching parameters used for retouching the local adjustable area.

In a specific example, a retouching button corresponding to the retouching parameter is displayed in the second touch area. The local retouching control is further configured to display the second prompt information by using the retouching button corresponding to the historical retouching parameter. For example, as shown in FIG. 3, if the saturation parameter is a historical retouching parameter that has been used for retouching the local adjustable area, and the brightness parameter is the retouching parameter that is currently used for retouching the local adjustable area, an underline prompt may be added to the “Saturation” button to distinguish from the buttons of other retouching parameters. In this way, the user can intuitively determine the retouching parameter used in the local adjustable area through the second prompt information. However, in practice, other prompting manners may be set, which is not limited in the embodiment of the present disclosure.

In practice, the local adjustable area corresponds to at least a selected state and an adjusted state. In this case, the local retouching control is further configured to highlight the local adjustable area via a preset mask in a case that the local adjustable area is in the selected state, to distinguish the local adjustable area from other areas in the to-be-edited image or the target image. Alternatively, in a case that the local adjustable area is in the adjusted state, the preset mask set on the local adjustable area is hidden. In this way, the degree of visualization is increased and the usage scenarios are enriched. In addition, the degree of perception of the user during the adjustment process can be improved, which can realize refined retouching and improve the user experience.

Further, the local retouching control is further configured to control the preset mask to highlight within a preset time range in a case that the local adjustable area is the selected state. In this way, from the perspective of visualization, on the basis of improving the intuitive perception of the user, control of the user on the entire image is improved, avoiding the inability to control the overall image due to the highlighting of the preset mask, thereby further improving the user experience.

In a specific example, as shown in FIG. 3, a sliding rod is displayed in the first touch area. The local retouching control is further configured to detect a touch operation performed on the sliding rod, and determine, based on an operation feature of the touch operation, an adjustment feature for the size of the local adjustable area, and displays the local adjustable area with an adjusted size. For example, a distance between an initial position A and a target position B on the sliding rod is determined based on the operation feature of the touch operation, and the size of the local adjustable area is adjusted based on the distance, and the adjusted local adjustable area is displayed. The above process is simple and has a high degree of visualization. Moreover, since it is unnecessary to set a preset gesture to adjust the size of the local adjustable area, the preset gesture is released when there are limited gesture operation manners. The problem that a preset gesture corresponds to different operation instructions in different scenarios can be avoided, which in turn reduce misoperation, thereby improving the user experience while meeting different needs of users.

Detailed description is made in the following in combination with the following specific application scenario. In the scenario, in a case that the local retouching function is activated, a target point (that is, a local adjustable area) is added on the screen displaying the to-be edited image in the first area through a touch operation. In this case, a retouching parameter, for example, a brightness parameter, is selected by default. Correspondingly, a blue range will appear on the target point, and "Brightness" is displayed in the blue range (to prompt the current brightness parameter). Here, in practice, the blue range may disappear within a preset time period to maximally avoid the overall image effect from being blocked on the basis of displaying the local action range. In addition, the blue range may be adjusted by the sliding rod, and correspondingly, the brightness parameter may be adjusted by the sliding rod corresponding to the brightness parameter.

In this way, since the action range of the target point, that is, a size of the target point, may be adjusted by the sliding rod, compared with the conventional way of adjusting the action range via a gesture of zoom in or out by two fingers after selecting the target point, the present disclosure can release the gesture of zoom-in or zoom-out by two fingers, so that this gesture can be used to adjust the size of the entire image, without taking into account the action range of adjustment of the target point, thus reducing the probability of misoperation and improving user experience.

Here, it should be noted that the present disclosure does not limit the manner of adjusting the retouching parameter, which may be performed in any manner, as long as the retouching can be performed and the retouching effect can be achieved. For example, a sliding rod may be used to adjust the parameter value of the retouching parameter, and so on.

In addition, in practice, in order to simplify the process and avoid complex operations, the local retouching interface further displays a copy button corresponding to the copy function. Further, the local retouching control is further configured to obtain a retouching feature of a currently selected local adjustable area and form a target local adjustable area at a preset position of the first area in response to a copy operation performed on the copy button, where a retouching feature of the target local adjustable area matches with the retouching feature of the currently selected local adjustable area. That is, by using the copy button, a retouching feature of the currently selected local adjustable area may be acted on a new local adjustable area, that is, the target local adjustable area. In addition, in the copying process, it is unnecessary to select an operation position in advance, it is only required to move, after the copy operation is performed successfully, the target local adjustable area to make the retouching feature of the currently selected local adjustable area to act on the target local adjustable area, the operation of which is simple, thereby further improving the user experience. Here, the retouching feature may specifically be a retouching parameter and a feature value corresponding to the retouching parameter. In this way, a retouching parameter of the target local adjustable area obtained by copying may be the same as a retouching parameter of the currently selected local adjustable area, the parameter values thereof are also the same, and the action ranges are also the same, so as to improve the efficiency of retouching. For example, if the to-be-edited image is a portrait, and the currently selected local adjustable area is one eye of the portrait, and the image is retouched by using the retouching parameter. In a case that the copy operation is performed, a new local adjustable area which is the same as a retouched image, that is, the target local adjustable area may be obtained at a preset position in the first area. In this way, the target local adjustable area can be directly dragged to the other eye of the portrait, to achieve the same retouching effect as the first eye.

In this way, the local retouching interface of the solution of the present disclosure not only displays the second touch area including a retouching parameter, but also displays the first touch area that may adjust the size of the local adjustable area, so that the retouching parameter is used to retouching the local adjustable area, and the first touch area is used to adjust the size of the local adjustable area, the operation of which is simple. In addition, since it is unnecessary to set a preset gesture to adjust the size of the local adjustable area, the preset gesture is released when there are limited gesture operation manners. The problem that a preset gesture corresponds to different operation instructions in different scenarios can be avoided, which in turn reduces misoperation, thereby improving the user experience while meeting different needs of users.

An electronic device is further provided according to an embodiment of the present disclosure, which includes at least: a storage component configured to store an image; and an image processing component connected to the storage component, where the image processing component is the above-described image processing component.

Figure 4:
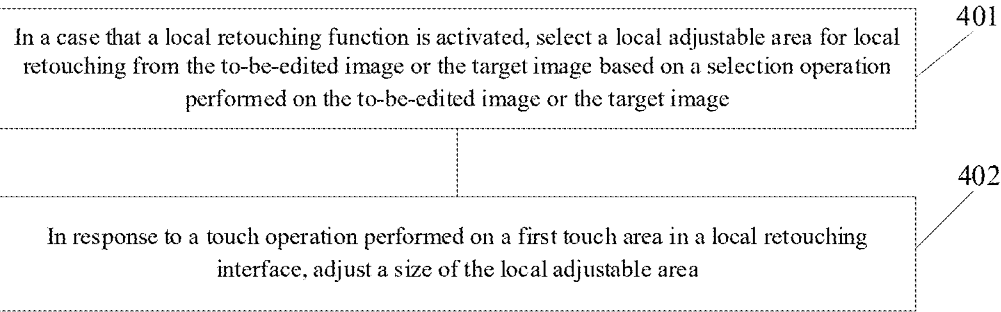
FIG. 4 is a schematic flowchart of an image processing method according to an embodiment of the present disclosure.

An image processing method is further provided according to an embodiment of the present disclosure. A to-be-edited image or a target image obtained by retouching the to-be-edited image is displayed in a first area of a display area of an electronic device, as shown in FIG. 4, the method includes the following steps 401 to 402.

In step 401, in a case that a local retouching function is activated, a local adjustable area for local retouching is selected from the to-be-edited image or the target image based on a selection operation performed on the to-be-edited image or the target image, where the local adjustable area is displayed via a preset mask to be distinguished from the other areas in the to-be-edited image or the target image.

In step 402, in response to a touch operation performed on the first touch area in a local retouching interface, a size of the local adjustable area is adjusted, where the local retouching interface is displayed in the display area other than the first area, and is used to display, in addition to the first touch area, a second touch area including at least a retouching parameter for retouching the local adjustable area.

In an embodiment, the method further includes: displaying first prompt information in the local adjustable area, where the first prompt information is used for prompting a parameter feature of a retouching parameter that is currently used for retouching the local adjustable area.

In an embodiment, the method further includes: displaying second prompt information in the local retouching interface, where the second prompt information is at least used for prompting a parameter feature of a historical retouching parameter that is used for retouching the local adjustable area in history.

In an embodiment, the second touch area displays a retouching button corresponding to the retouching parameter, and the method further includes: displaying the second prompt information by using the retouching button corresponding to a historical retouching parameter.

In an embodiment, the local adjustable area corresponds to at least a selected state and an adjusted state, and the method further includes: in a case that the local adjustable area is in the selected state, highlighting the local adjustable area via the preset mask to distinguish the local adjustable area from the other areas in the to-be-edited image or the target image; or in a case that the local adjustable area is in the adjusted state, hiding the preset mask on the local adjustable area.

In an embodiment, the method further includes: in a case that the local adjustable area is in the selected state, controlling the preset mask to highlight within a preset time range.

In an embodiment, the first touch area displays a sliding rod, and the method further includes: detecting a touch operation performed on the sliding rod, determine, based on an operation feature of the touch operation, an adjustment feature of a size of the local adjustable area, and display the local adjustable area with an adjusted size.

In an embodiment, a size of the preset mask is the same as the size of the local adjustable area, and changes as the local adjustable area changes.

In an embodiment, the local retouching interface further displays a copy button corresponding to a copy function, and the method further includes: obtaining a retouching feature of a currently selected local adjustable area and form a target local adjustable area at a preset position in the first area in response to a copy operation performed on the copy button, where a retouching feature of the target local adjustable area matches with the retouching feature of the currently selected local adjustable area.

It should be noted that the above description of the method embodiments is similar to the above description of the image processing assemblies, and has the same beneficial effects as the image processing component embodiments, which will not be repeated here. For technical details not described in the electronic device embodiments of the present disclosure, those skilled in the art may refer to the description of the image processing component embodiments of the present disclosure, which will not be repeated here.

Figure 5:
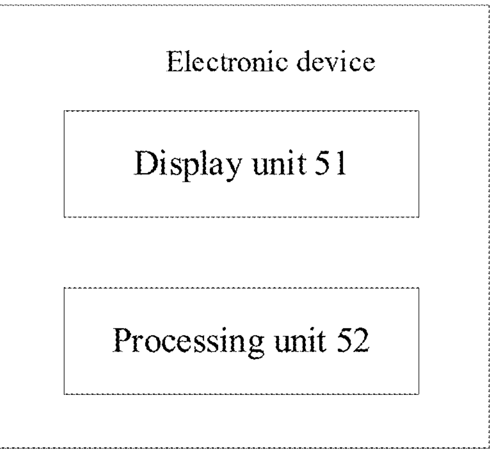
FIG. 5 is a schematic structural diagram of logic units of an electronic device according to an embodiment of the present disclosure.

An electronic device is further provided according to an embodiment of the present disclosure, as shown in FIG. 5, the electronic device includes: a display unit 51 and a processing unit 52. The display unit 51 is configured to display, in a first area of a display area, a to-be-edited image or a target image obtained by retouching the to-be-edited image, and is further configured to display a local retouching interface in another area than the first area in the display area. The local retouching interface displays at least a first touch area for adjusting a size of the local adjustable area, and a second touch area including at least a retouching parameter for retouching the local adjustable area. The processing unit 52 is configured to select, in a case that a local retouching function is activated, a local adjustable area for local retouching from the to-be-edited image or the target image based on a selection operation performed on the to-be-edited image or the target image, where the local adjustable area is displayed via a preset mask to be distinguished from the other areas in the to-be-edited image or the target image; and adjust a size of the local adjustable area in response to a touch operation performed on the first touch area in a local retouching interface.

In an embodiment, the display unit 51 is further configured to display first prompt information in the local adjustable area, where the first prompt information is used for prompting a parameter feature of a retouching parameter that is currently used for retouching the local adjustable area.

In an embodiment, the display unit 51 is further configured to display second prompt information in the local retouching interface, where the second prompt information is at least used for prompting a parameter feature of a historical retouching parameter that is used for retouching the local adjustable area in history.

In an embodiment, the display unit 51 is further configured to display a retouching button corresponding to the retouching parameter in the second touch area; and display the second prompt information by using the retouching button corresponding to a historical retouching parameter.

In an embodiment, the local adjustable area corresponds to at least a selected state and an adjusted state, and the processing unit 52 is further configured to: in a case that the local adjustable area is in the selected state, highlight the local adjustable area via the preset mask to distinguish the local adjustable area from the other areas in the to-be-edited image or the target image; or in a case that the local adjustable area is in the adjusted state, hide the preset mask on the local adjustable area.

In an embodiment, the display unit 51 is further configured to: in a case that the local adjustable area is in the selected state, control the preset mask to highlight within a preset time range.

In an embodiment, the first touch area displays a sliding rod, and the processing unit 52 is further configured to: detect a touch operation performed on the sliding rod, and determine, based on an operation feature of the touch operation, an adjustment feature for the size of the local adjustable area, and displays the local adjustable area with an adjusted size.

In an embodiment, the display unit 51 is further configured to display a copy button corresponding to a copy function in the local retouching interface, and the processing unit 52 is further configured to: obtain a retouching feature of a currently selected local adjustable area and form a target local adjustable area at a preset position in the first area in response to a copy operation performed on the copy button, where a retouching feature of the target local adjustable area matches with the retouching feature of the currently selected local adjustable area.

It should be noted that the above description of the electronic device embodiments is similar to the above description of the methods, and has the same beneficial effects as the method embodiments, which will not be repeated here. For technical details not described in the electronic device embodiments of the present disclosure, those skilled in the art may refer to the description of the method embodiments of the present disclosure, which will not be repeated here.

An electronic device is further provided according to an embodiment of the present disclosure, which includes: one or more processors; a memory communicatively coupled to the one or more processors; and one or more application programs. The one or more application programs are stored in the memory and configured to be executed by the one or more processors, and the one or more programs are configured to perform the above-described method.

Figure 6:
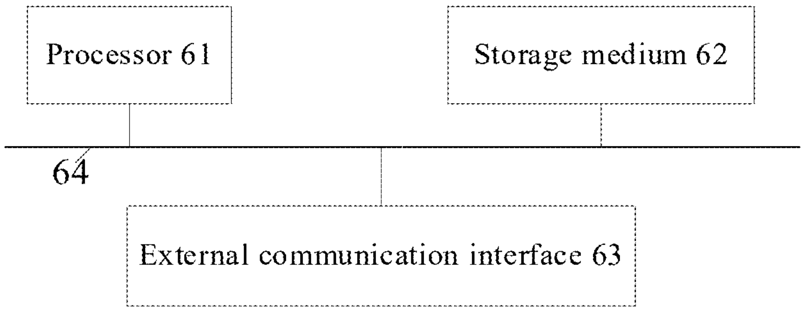
FIG. 6 is a schematic diagram of a hardware structure of an electronic device according to an embodiment of the present disclosure.

In a specific example, the electronic device described in the embodiment of the present disclosure may have a structure as shown in FIG. 6, and the electronic device includes at least a processor 61, a storage medium 62 and at least one external communication interface 63. The processor 61, the storage medium 62 and the external communication interface 63 are connected through a bus 64. The processor 61 may be an electronic element with processing functions, such as a microprocessor, a central processing unit, a digital signal processor, and a programmable logic array. The storage medium stores computer-executable codes, and the computer-executable codes may be used to performed the method described in any of the above embodiments. In practice, the display unit 51 and the processing unit 52 may be implemented by the processor 61. Alternatively, both the display control and the local retouching control may be implemented by the processor 61.

A computer-readable storage medium is further provided according to an embodiment of the present disclosure, which stores a computer program. The computer program, when executed by a processor, performs the above-described method.

Here, the computer-readable storage medium may be any apparatus that may contain, store, communicate, propagate, or transport the program for use by or in connection with an instruction execution system, apparatus, or device. More specific examples (non-exhaustive list) of the computer readable storage medium include the following: electrical connections (electronic devices) with one or more wiring, portable computer disk cartridges (magnetic devices), random access memory (RAM), read only memory (ROM), erasable editable read only memory (EPROM or Flash Memory), fiber optic devices, and portable read only memory (CDROM). In addition, the computer-readable storage medium may even be paper or other suitable medium on which the program can be printed, this is because that, for example, by optically scanning the paper or other medium, editing, interpreting or other necessary processing in a suitable manner, the program can be obtained electronically and stored in a computer memory.

It should be understood that those skilled in the art may understand that all or some of the steps of the method in the above embodiments may be implemented by instructing relevant hardware through a program, and the program may be stored in a computer-readable storage medium. The program, when executed, performs one or any combination of the steps of the method embodiment.

In addition, functional elements in each embodiment of the present disclosure may be integrated into one processing module, or may exist physically alone, or two or more elements may be integrated into one module. The above-described integrated modules may be implemented in the form of hardware, and may also be implemented in the form of software function modules. If the integrated modules are implemented in the form of software functional modules and sold or used as independent products, the integrated modules may also be stored in a computer-readable storage medium. The storage medium may be a read-only memory, a magnetic disk, an optical disk, or the like.

A computer program product is further provided according to an embodiment of the present disclosure, which includes computer instructions. The computer instructions, when executed by a processor, perform the above-described method.

The above embodiments are only some, rather than all of the embodiments of the present disclosure. Based on the embodiments in the present disclosure, all other embodiments obtained by those skilled in the art without creative work should fall within the protection scope of the present disclosure.

What is claimed is:

1. A method of processing images, comprising:

displaying an interface configured to perform local retouching on a partial area of an image, wherein the interface comprises a first area configured to adjust a size of the partial area of the image, and wherein the interface further comprises a second area configured to apply a plurality of retouching parameters to the partial area of the image;

determining the partial area of the image in response to receiving a user input;

implementing the local retouching on the partial area of the image in response to receiving touch operations via the interface; and displaying, in the partial area of the image, first prompt information indicating one of the retouching parameters that is currently applied to the partial area of the image.

2. The method of claim 1, further comprising:

adjusting the size of the partial area of the image based on a touch operation performed in the first area; and changing, in real time, a range of applying the at least one retouching parameter as the size of the partial area of the image is adjusted.

3. The method of claim 1, wherein the method further comprises:

displaying second prompt information, wherein the second prompt information indicates one of the plurality of retouching parameters that was historically applied to the partial area of the image.

4. The method of claim 1, further comprising:

displaying the partial area of the image using a mask to visually differentiate the partial area of the image from other areas of the image.

5. The method of claim 4, further comprising:

displaying the partial area of the image using the mask for a predetermined time period.

6. The method of claim 1, further comprising:

displaying a sliding rod in the first area; and adjusting the size of the partial area of the image in response to detecting an operation performed on the sliding rod.

7. An electronic device of processing images, comprising:

at least one processor; and at least one memory communicatively coupled to the at least one processor and comprising computer-readable instructions that upon execution by the at least one processor cause the at least one processor to perform operations, the operations comprising:

displaying an interface configured to perform local retouching on a partial area of an image, wherein the interface comprises a first area configured to adjust a size of the partial area of the image, and wherein the interface further comprises a second area configured to apply a plurality of retouching parameters to the partial area of the image;

determining the partial area of the image in response to receiving a user input;

implementing the local retouching on the partial area of the image in response to receiving touch operations via the interface; and displaying, in the partial area of the image, first prompt information indicating one of the retouching parameters that is currently applied to the partial area of the image.

8. The electronic device of claim 7, the operations further comprising:

adjusting the size of the partial area of the image based on a touch operation performed in the first area; and changing, in real time, a range of applying the at least one retouching parameter as the size of the partial area of the image is adjusted.

9. The electronic device of claim 7, wherein the operations further comprise:

displaying second prompt information, wherein the second prompt information indicates one of the plurality of retouching parameters that was historically applied to the partial area of the image.

10. The electronic device of claim 7, the operations further comprising:

displaying the partial area of the image using a mask to visually differentiate the partial area of the image from other areas of the image.

11. The electronic device of claim 10, the operations further comprising:

displaying the partial area of the image using the mask for a predetermined time period.

12. The electronic device of claim 7, the operations further comprising:

displaying a sliding rod in the first area; and adjusting the size of the partial area of the image in response to detecting an operation performed on the sliding rod.

13. A non-transitory computer-readable storage medium, storing computer-readable instructions that upon execution by a processor cause the processor to implement operations, the operations comprising:

displaying an interface configured to perform local retouching on a partial area of an image, wherein the interface comprises a first area configured to adjust a size of the partial area of the image, and wherein the interface further comprises a second area configured to apply a plurality of retouching parameters to the partial area of the image;

determining the partial area of the image in response to receiving a user input;

implementing the local retouching on the partial area of the image in response to receiving touch operations via the interface; and displaying, in the partial area of the image, first prompt information indicating one of the retouching parameters that is currently applied to the partial area of the image.

14. The non-transitory computer-readable storage medium of claim 13, the operations further comprising:

adjusting the size of the partial area of the image based on a touch operation performed in the first area; and changing, in real time, a range of applying the at least one retouching parameter as the size of the partial area of the image is adjusted.

15. The non-transitory computer-readable storage medium of claim 13, wherein the operations further comprise:

displaying second prompt information, wherein the second prompt information indicates one of the plurality of retouching parameters that was historically applied to the partial area of the image.

16. The non-transitory computer-readable storage medium of claim 13, the operations further comprising:

displaying the partial area of the image using a mask to visually differentiate the partial area of the image from other areas of the image.

17. The non-transitory computer-readable storage medium of claim 13, the operations further comprising:

displaying a sliding rod in the first area; and adjusting the size of the partial area of the image in response to detecting an operation performed on the sliding rod.

* * * * *